United States Patent
Wei

(10) Patent No.: US 11,940,925 B2
(45) Date of Patent: Mar. 26, 2024

(54) PERFORMING MEMORY ACCESS OPERATIONS WITH A LOGICAL-TO-PHYSICAL MAPPING TABLE WITH REDUCED SIZE

(71) Applicant: MICRON TECHNOLOGY, INC., Boise, ID (US)

(72) Inventor: Meng Wei, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 13 days.

(21) Appl. No.: 17/582,783

(22) Filed: Jan. 24, 2022

(65) Prior Publication Data

US 2023/0205707 A1   Jun. 29, 2023

Related U.S. Application Data

(60) Provisional application No. 63/294,495, filed on Dec. 29, 2021.

(51) Int. Cl.
| | |
|---|---|
| *G06F 12/10* | (2016.01) |
| *G06F 12/02* | (2006.01) |
| *G06F 12/08* | (2016.01) |
| *G06F 12/0891* | (2016.01) |
| *G06F 12/1009* | (2016.01) |

(52) U.S. Cl.
CPC ...... *G06F 12/1009* (2013.01); *G06F 12/0246* (2013.01); *G06F 12/0891* (2013.01); *G06F 2212/7201* (2013.01)

(58) Field of Classification Search
CPC ............. G06F 12/1009; G06F 12/0246; G06F 12/0891; G06F 2212/7201
See application file for complete search history.

(56) References Cited

U.S. PATENT DOCUMENTS

| | | | |
|---|---|---|---|
| 2012/0011340 A1* | 1/2012 | Flynn ................. | G06F 12/0623 711/E12.016 |
| 2018/0260319 A1* | 9/2018 | Thompson .......... | G06F 12/0246 |
| 2019/0130102 A1* | 5/2019 | Johnson ............. | G06F 12/1045 |
| 2019/0138454 A1* | 5/2019 | Choi ................... | G06F 12/0246 |
| 2020/0057562 A1* | 2/2020 | Lee .................... | G06F 12/0246 |
| 2022/0214808 A1* | 7/2022 | Lin .................... | G06F 12/0246 |

* cited by examiner

*Primary Examiner* — Masud K Khan
(74) *Attorney, Agent, or Firm* — Lowenstein Sandler LLP

(57) ABSTRACT

A logical-to-physical (L2P) data structure comprising a plurality of L2P table entries is maintained on the volatile memory device. Each L2P table entry comprises a block number and a page table index corresponding to the non-volatile memory device. A plurality of physical-to-logical (P2L) data structures each comprising a plurality of P2L table entries is maintained on the volatile memory device. Each of the plurality of P2L data structures corresponds to a portion of the L2P data structure.

16 Claims, 9 Drawing Sheets

```
┌─────────────────────────────────────────────────────────────────────┐
│  Maintain, on the volatile memory device, a logical-to-physical (L2P) data structure │
│  comprising a plurality of L2P table entries, wherein each L2P table entry comprises a │
│  block number and a page table index corresponding to the non-volatile memory device. │
│                                  610                                │
└─────────────────────────────────────────────────────────────────────┘
                                    │
                                    ▼
┌─────────────────────────────────────────────────────────────────────┐
│  Maintain, on the volatile memory device, a plurality of physical-to-logical (P2L) data │
│     structures each comprising a plurality of P2L table entries, wherein each of the │
│   plurality of P2L data structures corresponds to a portion of the L2P data structure. │
│                                  620                                │
└─────────────────────────────────────────────────────────────────────┘
```

FIG. 6

Responsive to receiving, from a host system, a request to perform a memory access operation on a logical address of a non-volatile memory device, identify a physical-to-logical (P2L) data structure, of a plurality of physical-to-logical (P2L) data structures. 710

Search the identified P2L data structure of the plurality of P2L data structures to obtain the physical address associated with the logical address. 720

Translate the entry of the identified P2L data structure matching the logical address to the physical address. 730

FIG. 7

PERFORMING MEMORY ACCESS OPERATIONS WITH A LOGICAL-TO-PHYSICAL MAPPING TABLE WITH REDUCED SIZE

RELATED APPLICATIONS

This application claims the benefit of U.S. Provisional Patent Application No. 63/294,495, filed Dec. 29, 2021, the entirety of which is incorporated herein by reference.

TECHNICAL FIELD

Embodiments of the disclosure relate generally to memory sub-systems, and more specifically, relate to performing memory access operations with a logical-to-physical mapping table with reduced size.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 2 illustrates a logical-to-physical mapping table with reduced size in accordance with some embodiments of the present disclosure.

FIGS. 3A and 3B illustrates searching a physical-to-logical mapping table based on the logical-to-physical mapping table with reduced size in accordance with some embodiments of the present disclosure.

FIG. 6 is a flow diagram of an example method of performing memory access operation with a logical-to-physical mapping table with reduced size in accordance with some embodiments of the present disclosure.

FIG. 7 is a flow diagram of an example method of performing memory access operation with a logical-to-physical mapping table with reduced size in accordance with some embodiments of the present disclosure.

DETAILED DESCRIPTION

Figure 1:
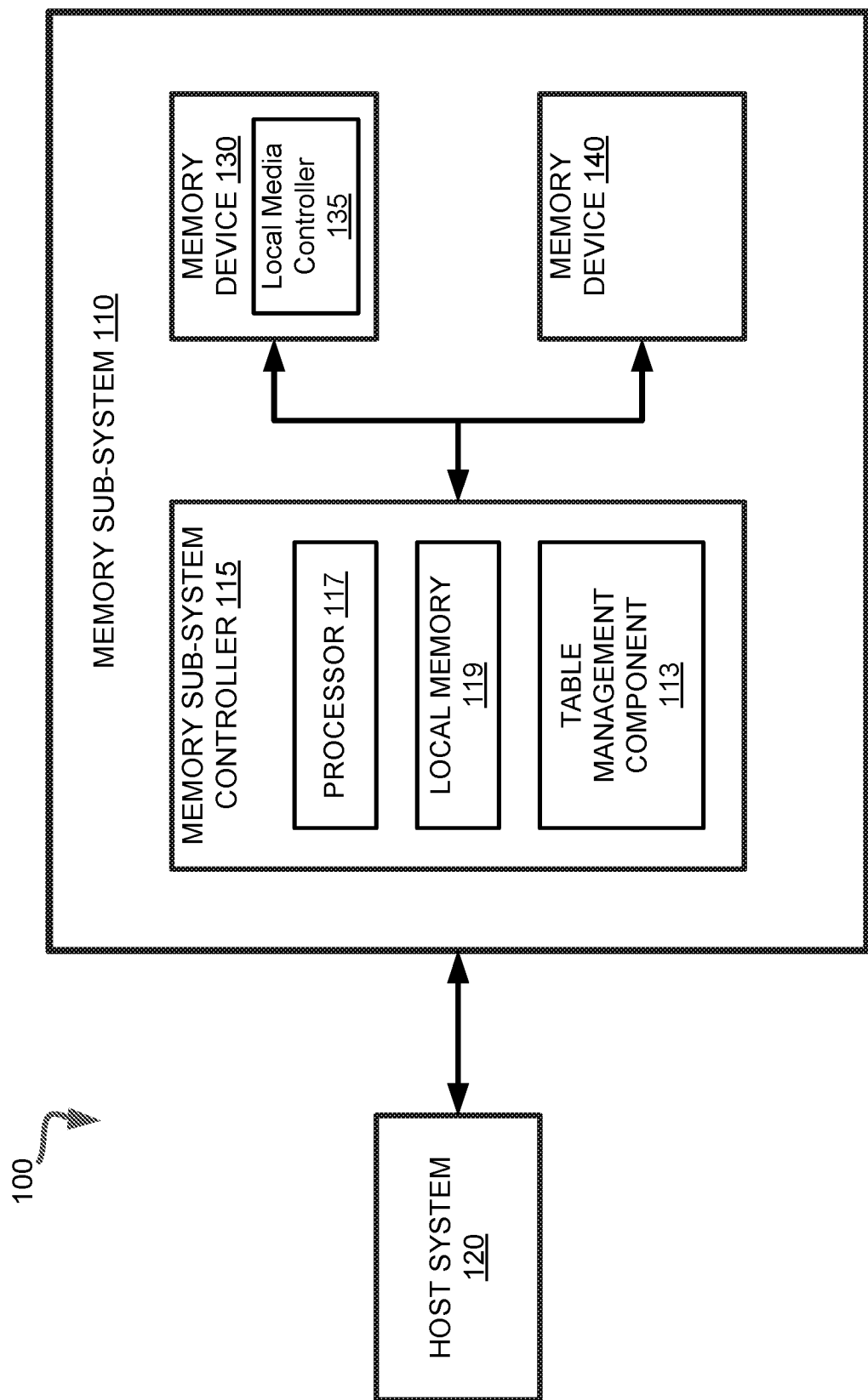
FIG. 1 illustrates an example computing system that includes a memory sub-system in accordance with some embodiments of the present disclosure.

Aspects of the present disclosure are directed to implementing a mapping data structure to reduce storage size of a logical to physical mapping table. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can consist of one or more memory planes ("planes"). For some types of non-volatile memory devices (e.g., NAND devices), each plane consists of a set of physical blocks ("blocks"). Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional or three-dimensional grid. Memory cells are etched onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types.

For example, a memory device (e.g., NAND) of a memory sub-system (e.g., SSD) can be associated with a number of logical units (LUs) each providing a logical representation of a portion of the memory device (e.g., storage volume). Each LU is assigned a logical unit number (LUN) which is used by a host system to identify the LU when attached to the host system using a suitable interface standard. For example, a LUN can be associated with a plane of the memory device, and each plane can include a number of physical translation units (TUs). A TU corresponds to a base granularity of data managed by the memory device. For example, each TU can correspond to a physical address, which defines a physical location of the memory device with respect to a particular LUN and plane. In some examples, a given LUN can include 4 planes, and each of the planes can include 4 TUs (e.g., 16 TUs per LUN).

A memory sub-system controller ("controller") can be responsible for maintaining a logical-to-physical (L2P) mapping data structure (e.g., L2P mapping table) on volatile memory (e.g., SRAM or DRAM). The L2P mapping table maintains a one-to-one mapping for a number of logical addresses to respective physical addresses. For example, in the case of NAND flash memory, a logical address can be one example of a logical translation unit (LTU). The logical addresses can correspond to a number of contiguous physical addresses on the memory device (e.g., 16 LTUs, 32 LTUs, and 64 LTUs). In the case of NAND flash memory, the physical addresses can be referred to as flash physical addresses (PAs). For example, if the L2P mapping data structure maintains 32 LTUs, denoted as $LTU_0$ through $LTU_{31}$ and 32 PAs, denoted as $PA_0$ through $PA_{31}$, the L2P mapping data structure can define mappings between $LTU_0$ through $LTU_{31}$ and respective ones of $PA_0$ through $PA_{31}$.

Upon receiving a data access request (e.g., read command and/or write command) from the host system designating a logical address (e.g., LTU), the logical address is translated into the corresponding physical address of the memory device (e.g., LUN, plane, TU) to handle the data access request. To do so, the L2P mapping table can be maintained to manage the translations. Accordingly, each entry of the L2P mapping table stores a data structure containing the physical address of the memory device (e.g., LUN, block, page, plane, and TU). If data is sequentially written to contiguous locations of the memory device, then consecutive LTUs can be present in the same block or page.

Generally, as NAND technology is increasingly used, the size of NAND is set to increase (e.g., 128 TB). The major components that affect the size of the memory sub-system are the NAND, the controller, and the DRAM, which are adjusted as needed to compensate for the increased size. In conventional memory sub-systems, for every unit of DRAM the memory sub-system typically includes a thousand units of NAND (e.g., for a 8 TB NAND drive roughly about 8 GB of DRAM is needed for the L2P mapping table). Accordingly, if the size of NAND increases to 128 TB, the memory sub-system would require a minimum of 128 GB of DRAM which may be increasingly difficult due to an area and cost of the bill of materials for the memory sub-system.

In some embodiments, to minimize the size of the DRAM component, the size of the TU has been increased (e.g., doubled from the standard 4K TU size). For example, by doubling the size of the TU, the DRAM size may be cut in half. However, the performance of random write input/output operations per second (IOPS) are heavily impacted resulting in an increase in write amplification. In other embodiments, to minimize the size of the DRAM component, a mapping table swap is implemented to swap and cache partial mapping tables between the DRAM and NAND. Due to the swapping and caching of partial mapping tables between the DRAM and NAND, the DRAM size becomes dynamic with no required size. However, the performance of random read and writes are heavily impacted resulting in an increase in write amplification. Accordingly, a performance impact associated with random reads and writes performance as well as the write amplification reduces the endurance and performance of the memory sub-system.

Aspects of the present disclosure address the above and other deficiencies by providing a memory sub-system that reduces the size of each entry of the L2P table. In some embodiments, the size of the each entry of the L2P table may be reduced by storing in each entry a block number and a page table index associated with a physical-to-logical (P2L) mapping data structure (e.g., a page table). Accordingly, upon receiving a data access request (e.g., read command and/or write command) from the host system designating a logical address, a page table associated with the block number and the page table index, stored in the entry of the L2P table associated with the logical address, is accessed. Depending on the embodiment, each page table includes logical address information (e.g., LTU information) for each physical address. Thus, the logical address is translated into the corresponding physical address of the memory device by obtaining the physical address associated with an entry of the page table containing the LTU associated with the data access request.

Advantages of the present disclosure include, but are not limited to, reducing the size of DRAM of the memory device while maintaining performance and write amplification by reducing the size of each entry of the L2P mapping table.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a table management component 113 that can maintain a L2P mapping table or mapping table (e.g., L2P data structure) and a plurality of page tables (e.g., P2L data structure) in the volatile memory devices (e.g., memory device 140). Each entry of the L2P mapping table stores a block number and page table index corresponding to a physical location on the non-volatile memory devices (e.g., memory device 130). As noted above, each entry of the mapping table in a conventional memory sub-system would typically include a LUN having 11 bits, a block having 10 bits, a page having 12 bits, a plane having 2 bits, and a TU having 2 bits resulting in each entry of the mapping table having 37 bits. In contrast, by storing the block number having 10 bits and the page table index having 11 bits the total bit size for each entry is reduced by 16 bits. Each page table of the plurality of page tables is associated with a portion of the P2L mapping table.

The table management component 113, responsive receiving a request from the host system 120 to perform memory access operation on a logical address of memory device 130, identifies a page table from the plurality of page tables associated by accessing the logical address of the mapping table to obtain the block number and page table index associated with a page table of the plurality of page tables. Thus, to translate the logical address to a physical address, the table management component 113 searches the page table for the logical address. In some embodiment, to search the page table for the logical address, the table management component 113 traverses each entry of the page table in reverse order starting with a last entry of the page table to a first entry of the page table. With each entry of the page table, the table management component 113 determines whether the entry of the page table (e.g., logical address) matches the logical address associated with the data access request. Once an entry of the page table that matches the logical address associated with the data access request is found, the table management component 113 composes a physical address associated with the matching logical address based on its location in the page table (e.g., an index of the page table).

Depending on the embodiment, the table management component 113 can accelerate the page table search for the logical address. To accelerate the page table search for the logical address, the table management component 113 partitions the page table into a plurality of consecutive portions to preserve the original ordering of the page table. The table management component 113, traverse each entry of each consecutive portions, in parallel, in reverse order starting with the last entry of each consecutive portions of the page table to the first entry of each consecutive portions of the page table.

The table management component 113, for each consecutive portion, determines whether the entry the respective consecutive portion of the plurality of consecutive portions of the page table (e.g., logical address) matches the logical address associated with the data access request. If, the entry of the respective consecutive portion of the plurality of consecutive portions of the page table matches the logical address associated with the data access request, the table management component 113 returns a physical address associated with the matching logical address based on its location in the respective consecutive portion of the plurality of consecutive portions of the page table (e.g., an index of the page table). If, no entry of the respective consecutive portion of the plurality of consecutive portions of the page table match the logical address associated with the data access request, the table management component 113 returns a value indicating that no entry was found. Accordingly, each result is stored in order corresponding the order of the plurality of consecutive portions of the page table associated with the original ordering of the page table. Once the page table search for the logical address is complete, the table management component 113 selects the latest result containing a physical address.

Depending on the embodiment, responsive to a media management operation (e.g., garbage collection), the table management component 113 obtains the plurality of page tables from the mapping table. During garbage collection, for each page table of the plurality of page tables, the table management component 113 traverse each entry of the page table to determine whether a physical address in the mapping table based on the entry of the page table (e.g., using the LTU as an index to obtain the physical address in the mapping table) matches the current location of the page table (e.g., index of the page table). Accordingly, if the physical address in the mapping table matches the current location of the page table, the table management component 113 performs a folding operation with the physical address. Depending on the embodiment, the folding operation may include collecting the non garbage data (i.e., the address that are still mapped) and re-locating them to a new location. Any remaining data (e.g., garbage data) can be deleted to allow for reuse of the block.

However, since each mapping table contains only the block number and page table index and each page table includes a plurality of entries with the same logical address. Upon traversing each entry of the respective page table to determine whether the block number and page table index in the mapping table based on the entry of the page table matches the current location of the page table, the table management component 113 would determine that each of the plurality of entries with the same logical address would match thereby triggering a folding operation of the physical address with each match. Performing folding operation multiple times does not create data integrity issues, however, with each addition folding operation, operational overhead and write amplification is increased.

In one embodiment, to reduce the number of folding operation performed for the each of the plurality of entries with the same logical address, the table management component 113 during the garbage collection operation, for each entry of a page table (e.g., current page table), starting with the first entry of the page table, determines whether the block number and page table index in the mapping table corresponding to the logical address of the entry of the current page table matches the current page table. To determine if the block number and page table index associated with the logical address of the entry of the current page table matches the current page table, the table management component 113 determines whether the block number and page table index points to the current page table. If the block number and page table index points to the current page table, the table management component 113 composes a physical address associated with the entry of the current page table to compare to a physical address associated with the entry of the mapping table containing the block number and page table index pointing to the current page table (i.e., the updated physical address for the logical address). If the block number and page table index does not point to the current page table, the table management component 113, proceeds to the next entry of the current page table to repeat the process.

As noted above, to compose the physical address associated with the entry of the mapping table containing the block number and page table index pointing to the current page table, the table management component 113 traverses each entry of the current page table in reverse order starting with the last entry of the current page table to the first entry of the current page table to determine an entry of the current page table matching the logical address of the location associated with the entry of the mapping table containing the block number and page table index pointing to the current page table. Once the entry of the page table matches the logical address of the location associated with the entry of the mapping table containing the block number and page table index pointing to the current page table, the table management component 113 composes a physical address associated with the matching logical address based on its location in the current page table.

If the physical address associated with the entry of the current page table matches the physical address associated with the entry of the mapping table containing the block number and page table index pointing to the current page table, the table management component 113 performs a folding operation with the physical address. If the physical address associated with the entry of the current page table does not match the physical address associated with the entry of the mapping table containing the block number and page table index pointing to the current page table, the table management component 113, proceeds to the next entry of the current page table to repeat the process.

In yet another embodiment, to further optimize the garbage collection operation, during the garbage collection operation, for each entry of a page table (e.g., current page table), starting with the last entry of the page table, the table management component 113 determines whether the entry of the page table is invalid (e.g., contains 0xFFFFFFFFFF). If the entry of the page table is valid (e.g., contains any value other than 0xFFFFFFFFFF), the table management component 113 determines whether the block number and page table index in the mapping table corresponding to the logical address of the entry of the current page table (e.g., the block number and page table index in the mapping table corresponding to the logical address of interest) matches the current page table. To determine if the block number and page table index associated with the logical address of the entry of the current page table matches the current page table, the table management component 113 determines whether the block number and page table index points to the current page table. If the entry of the page table is invalid (e.g., contains a value of 0xFFFFFFFFFF), the table management component 113, proceeds to the next entry of the current page table to repeat the process.

If the block number and page table index points to the current page table, the table management component 113 performs a folding operation with the physical address (i.e., the last TU associated with the updated physical address is folded). After performing the folding operation with the physical address, the table management component 113, for each entry of the current page table, determine whether a respective logical address of the entry matches the logical address of interest. If the respective logical address of the entry matches the logical address of interest, the table management component 113 overwrites the value of the entry to indicate it is invalid (e.g., with the value 0xFFFFFFFFFF). Once the each entry that matches the logical address of interest is overwritten with the value 0xFFFFFFFFFF, the table management component 113, proceeds to the next entry of the current page table to repeat the process. If the block number and page table index does not point to the current page table, the table management component 113, proceeds to the next entry of the current page table to repeat the process. Further details with regards to the operations of the table management component 113 are described below.

In some embodiments, the memory sub-system controller 115 includes at least a portion of the table management component 113. In some embodiments, the table management component 113 is part of the host system 110, an application, or an operating system. In other embodiments, local media controller 135 includes at least a portion of table management component 113 and is configured to perform the functionality described herein.

Figure 2:
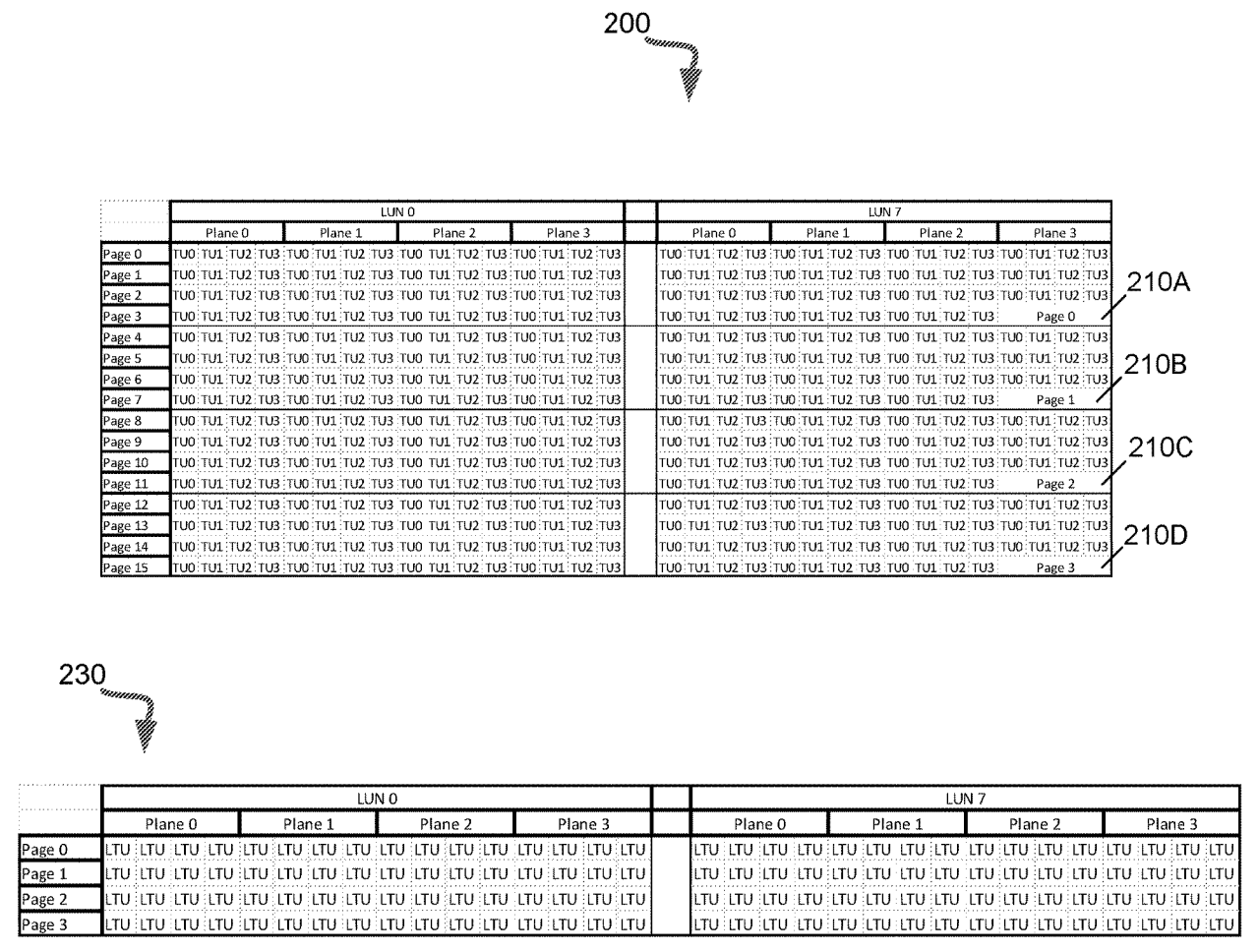

FIG. 2 illustrates a logical-to-physical (L2P) mapping data structure (e.g., mapping table 200) and a plurality of physical-to-logical (P2L) mapping data structures (e.g., page tables 210A-D) of the mapping table 200. The mapping table 200 and the plurality of page tables 210A-D of the mapping table 200 are stored in volatile memory 140 (FIG. 1). The mapping table 200 includes a plurality of logical addresses (e.g., LTUs) having a one-to-one mapping to respective physical addresses (e.g., TUs). Accordingly, each LTU of the mapping table corresponds to a LUN, a plane, and a page. Each LTU contains a TU associated with the LTU. Each TU defines the physical address associated with the logical address and contains a block number identifying the block associated with the physical address and a page index identifying the page table containing the logical address associated with the physical address.

Each page table 210A-D of the mapping table covers several pages of the block across every LUN with the same page index. Additionally, each page table 210A-D of the mapping table covers each block stripe across every LUN with the same block number. Each entry of the page table 210A-D of the mapping table (e.g., page table 230) records LTU information for each physical address (e.g., LUN, plane, page, TU) that the page table covers. Accordingly, to obtain a physical address for an LTU, the block number and page table index is retrieved from the entry of the mapping table associated with the LTU. The page table corresponding to the block number and page table index (e.g., page table 230 or one of page table 210A-D) is searched for the physical address associated with the LTU.

Figure 3A:
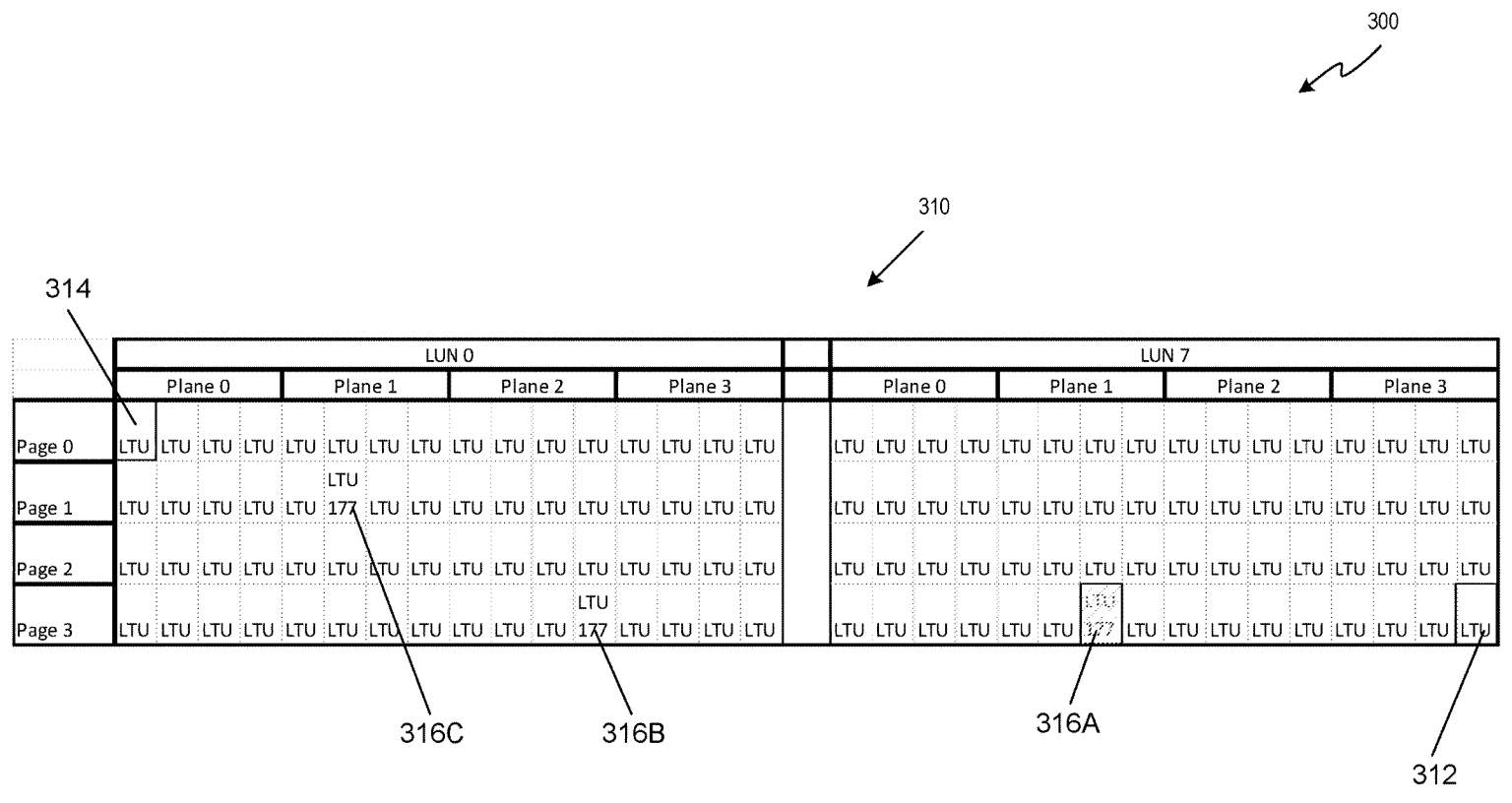
Figure 3B:
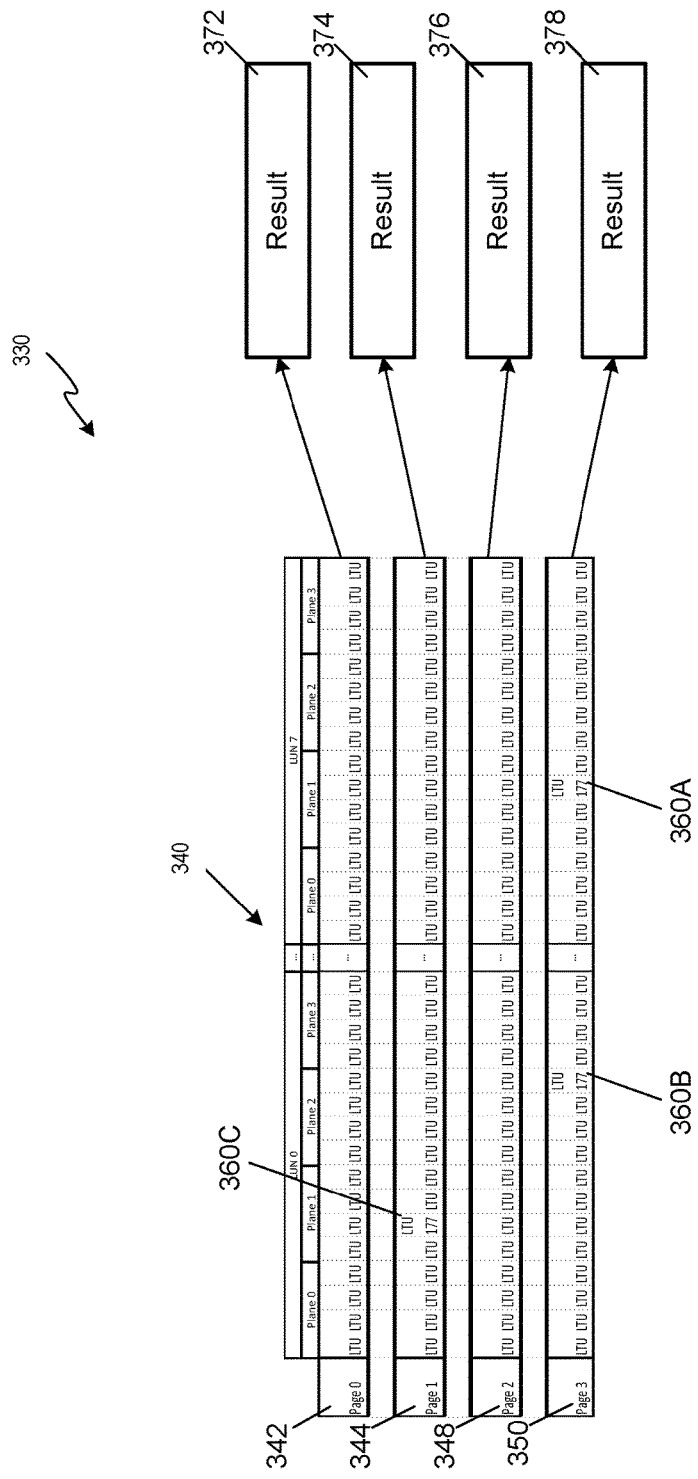

FIGS. 3A and 3B illustrates searching a physical-to-logical mapping table based on the logical-to-physical mapping table with reduced size. Referring to FIG. 3A, demonstrating search method 300 of a page table 310. Responsive to receiving a request to perform memory access operation on logical address 177 (e.g., LTU 177), LTU 177 contained a block number and page table index directed to page table 310. Each page table includes multiple physical address associated with the LTU 177 (e.g., 316A-C). The latest entry of the page table (e.g., 310) corresponds to the most recent physical address of the multiple physical addresses (e.g., 316A). To obtain the most recent physical address of LTU 177, the page table 310 is searched (e.g., traversed) from the last entry of the page table 310 (e.g., entry 312) to the first entry of the page table 310 (e.g., entry 314).

To fully traverse the entire page table 310, each entry (i.e., LTU) is compared to the logical address (LTU 177) to determine if the entry matches the logical address (LTU 177). Each entry is selected, by traversing from entry 312 to the beginning of the page (e.g., page 3). If no match is found, the last entry of the next page (e.g., page 2) is selected and then traversed until the beginning of the page (e.g., first entry of page 2). If no match is found, the last entry of the next page (e.g., page 1) is selected and then traversed until the beginning of the page (e.g., first entry of page 1). If no match is found, the last entry of the next page (e.g., page 0) is selected and then traversed until the beginning of the page (e.g., first entry of page 0). The first entry in the traversal that matches the logical address (LTU 177), the search is ended and a physical address based on the matching entry is determined. If no entry matches the logical address (LTU 177), the search is complete and no physical address is determined. The physical address is composed based on the location of the matching entry in the page table (e.g., the LUN, plane, page, and TU). For example, the first entry in the traversal that matches the logical address (LTU 177) is entry 316A, thus the physical address is composed based on entry 316A being located in LUN7, Plane1, Page3, and TU3.

Referring to FIG. 3B demonstrating search method 330 of a page table 340. Responsive to receiving a request to perform memory access operation on logical address 177 (e.g., LTU 177), LTU 177 contained a block number and page table index directed to page table 340. Each page table includes multiple physical address associated with the LTU 177 (e.g., 360A-C). The latest entry of the page table corresponds to the most recent physical address of the multiple physical addresses (e.g., 360A). To obtain the most recent physical address of LTU 177, the page table 340 is searched (e.g., traversed) from the last entry of the page table 340 to the first entry of the page table 340. To speed up the search, page table 340 is partitioned into a plurality of consecutive portions (e.g., partitioned portion 342, 344, 348, 350) (i.e., ordering of the portions are maintained according to their position prior to partitioning). Each partitioned portion may be a page, a plurality of pages, a subset of a page, or any other suitable grouping of the entries of the page table.

Accordingly, to traverse the entire page table 340, each partitioned portion 342, 344, 348, 350 is traversed in parallel. Each entry (i.e., LTU) of each partitioned portion 342, 344, 348, 350 is compared to the logical address (LTU 177) to determine if the entry matches the logical address (LTU 177). Each entry is selected, by traversing, similar to search method 300, from the last entry of each partitioned portion 342, 344, 348, 350 to the beginning of each partitioned portion 342, 344, 348, 350. If not match is found in a specific partition portion a result (e.g., result 372, 374, 376, 378) is returned indicating search is complete and/or no match found. If a match is found in a specific partition portion a result (e.g., result 372, 374, 376, 378) is returned indicating a physical address associated with the most recent physical address in the specific partition portion.

The physical address is composed based on the location of the matching entry in the page table (e.g., the LUN, plane, page, and TU). For example, result 372 returned by partition portion 342 would be no match found or search complete; result 374 returned by partition portion 344 would be a physical address associated with entry 360C (e.g., entry 360C being located in LUN0, Plane1, Page1, and TU2); result 376 returned by portion 348 would be no match found or search complete; and result 378 returned by portion 350 would be a physical address associated with entry 360A (e.g., entry 360A being located in LUN7, Plane1, Page3, and TU3). As shown in FIG. 3B, entry 360B would not be returned due to entry 360A matching the logical address (LTU 177) prior to reaching entry 360B. Results 372, 374, 376, and 378 are maintained in consecutive ordering to ensure that the most recent physical address is selected. To select the most recent physical address, starting with the last result (e.g., result 378) to the first result (e.g., result 372) determined which is the first result with a physical address. The first result with a physical address is the most recent physical address. For example, result 378 contains a physical address thus result 378 (e.g., entry 360A being located in LUN7, Plane1, Page3, and TU3) is the physical address associated with the logical address (LTU 177).

Figure 4:
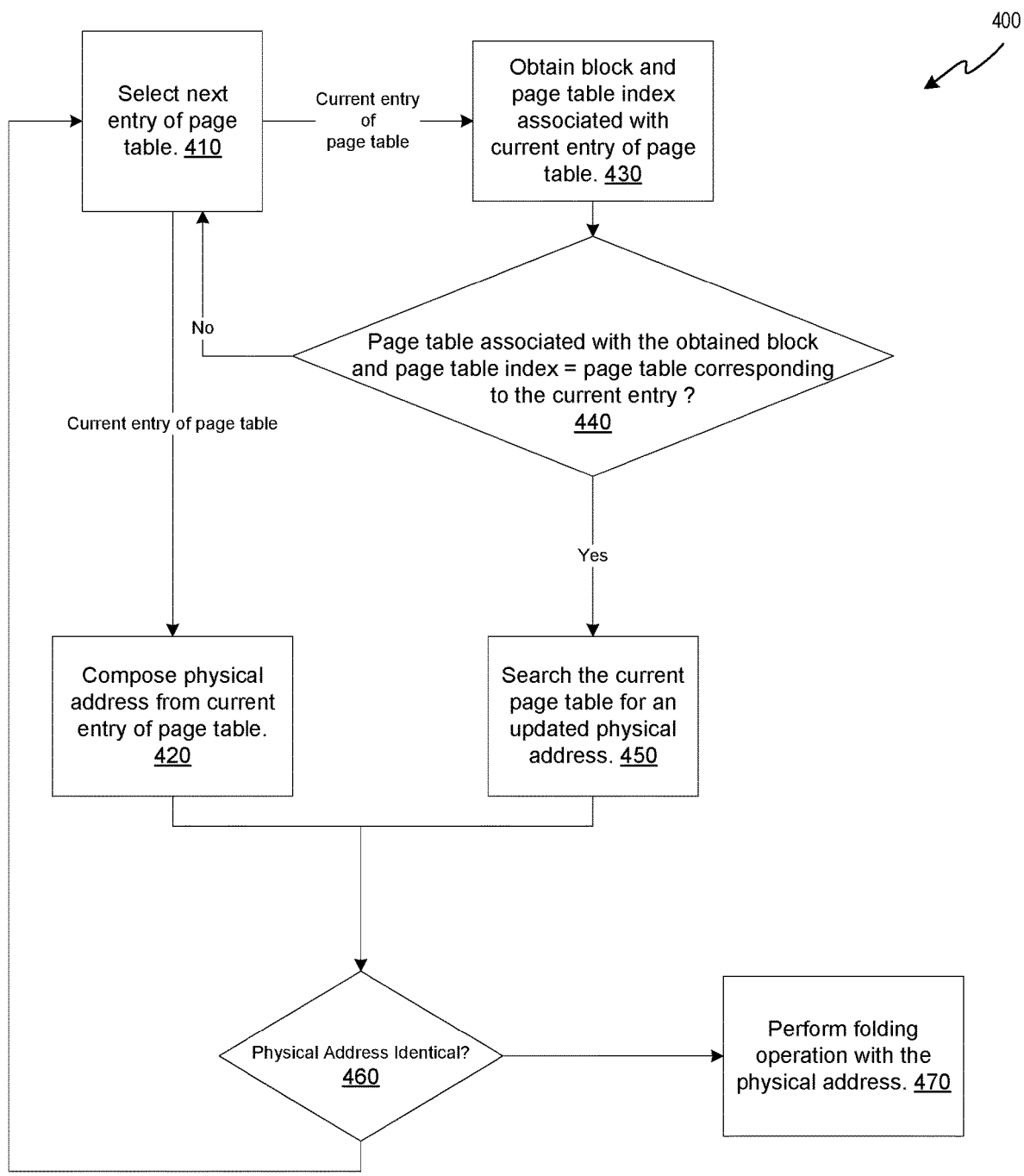
FIG. 4 is a flow diagram of an example method of performing media management operation in view of the logical-to-physical mapping table with reduced size in accordance with some embodiments of the present disclosure.

FIG. 4 is a flow diagram of an example method 400 of performing a media management operation in view of the logical-to-physical mapping table with reduced size, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the table management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic selects an entry of the page table. In some embodiments, the first entry of the page table is selected as the current entry of the page table. In one embodiment, over time, each entry is sequentially selected from the first entry to the last entry of the page table.

At operation 420, the processing logic composes a physical address from the current entry of the page table. As previously described, the location of each entry of the page table corresponds to a physical address (e.g., the LUN, plane, page, and TU). Accordingly, the physical address is composed based on the location of the current entry of the page table (e.g., the LUN, plane, page, and TU).

At operation 430, the processing logic obtains a block number and page table index associated with the current entry of the page table. As previously described, each entry of the page table has a corresponding LTU. Each LTU contains a block number and a page table index. Accordingly, based on the LTU in the current entry of the page table, the block number and page table index associated with the LTU in the current entry of the page table is obtained.

At operation 440, the processing logic determines whether a page table associated with the obtained block and page table index is the same as a page table corresponding the page table with the current entry. As previously described, a page table can be determined based on the obtained block number and page table index.

If the page table associated with the obtained block and page table index is the same as a page table corresponding the page table with the current entry, at operation 450, the processing logic searches the current page table for a most recent physical address associated with the logical address. Depending on the embodiment, the processing logic may perform the search based on search method 300 (FIG. 3A) or search method 330 (FIG. 3B).

If the page table associated with the obtained block and page table index is not the same as a page table corresponding the page table with the current entry, proceed to operation 410.

At operation 460, the processing logic determines whether the composed physical address is identical to the most recent physical address associated with the logical address. If the composed physical address is identical to the most recent physical address associated with the logical address, at operation 470, the processing logic performs a folding operation with the physical address. As described previously, the folding operation may include collecting the non garbage data and re-locating them to a new location, while deleting any garbage values remaining to allow for reuse of the block.

If the composed physical address is not identical to the most recent physical address associated with the logical address, proceed to operation 410.

Figure 5:
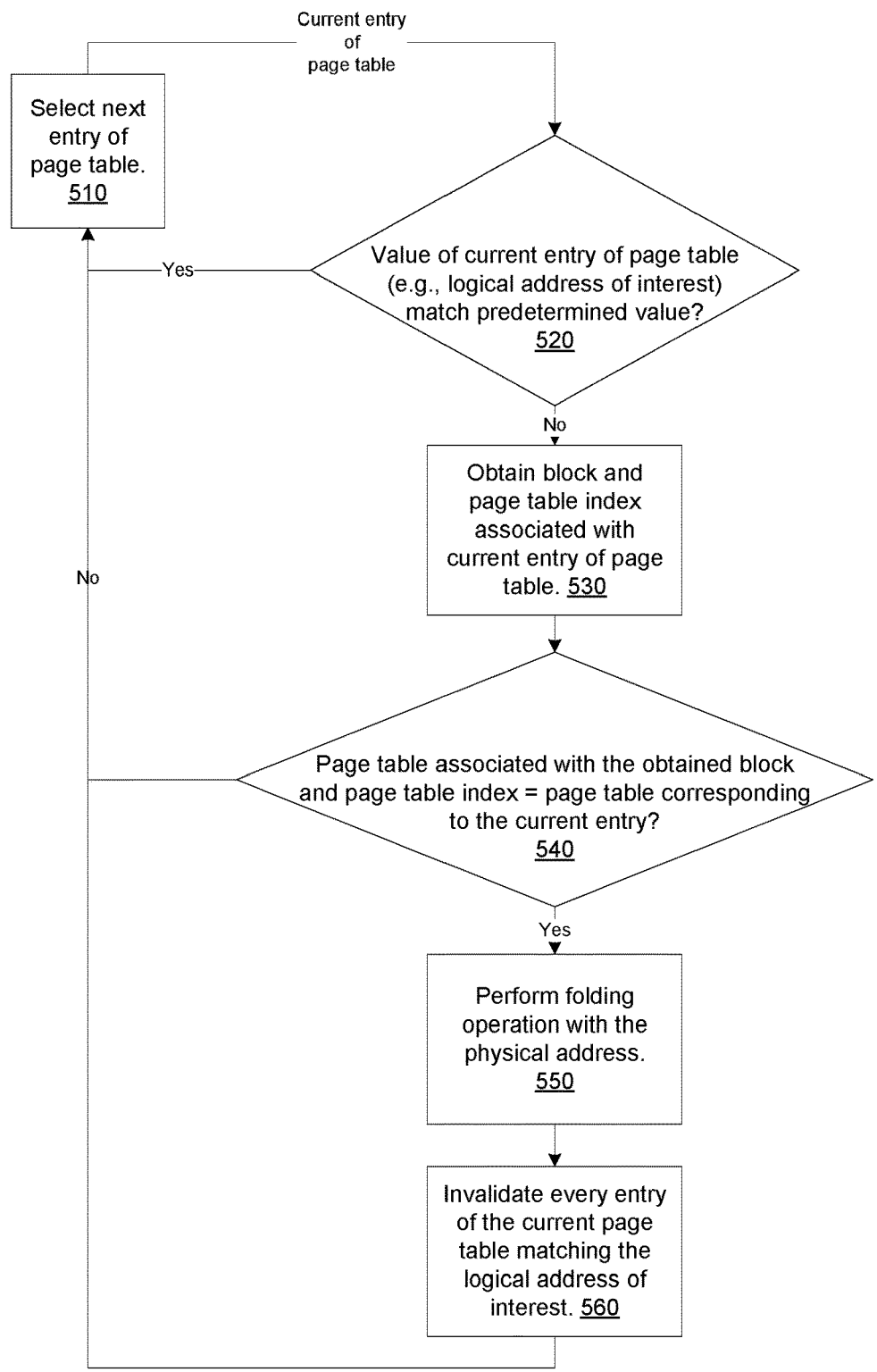
FIG. 5 is a flow diagram of an example method of performing media management operation in view of the logical-to-physical mapping table with reduced size in accordance with some embodiments of the present disclosure.

FIG. 5 is a flow diagram of an example method 500 to performing media management operation in view of the logical-to-physical mapping table with reduced size, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the table management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic selects an entry of the page table. In some embodiments, a last entry of the page table is selected as the current entry of the page table. Each entry is selected from the last entry to a first entry of the page table.

At operation 520, the processing logic determines whether the logical address in the entry of the page table matches a predetermined value. The predetermined value is 0xFFFFFFFFFF indicating that the logical address is invalid. If the logical address in the entry of the page table matches the predetermined value (e.g., 0xFFFFFFFFFF), proceed to operation 510.

If the logical address in the entry of the page table does not match the predetermined value (e.g., 0xFFFFFFFFFF), at operation 530, the processing logic obtains a block number and page table index associated with the current entry of the page table. As previously described, each entry of the page table has a corresponding LTU. Each LTU contains a block number and a page table index. Accordingly, based on the LTU in the current entry of the page table, the block number and page table index associated with the LTU in the current entry of the page table is obtained.

At operation 540, the processing logic determines whether a page table associated with the obtained block and page table index is the same as a page table corresponding to the current entry of the page table. As previously described, a page table can be determined based on the obtained block number and page table index. If the page table associated with the obtained block and page table index is the same as a page table corresponding the page table with the current entry, at operation 550, the processing logic performs a folding operation with the physical address. As described previously, the folding operation may include collecting the non garbage data and re-locating them to a new location, while deleting any garbage values remaining to allow for reuse of the block.

If the page table associated with the obtained block and page table index is not the same as a page table corresponding the page table with the current entry, proceed to operation 510.

At operation 560, the processing logic invalidates every entry of the current page table matching the logical address in the entry of the page table. Each entry of the current page table is invalidated by traversing the page table from the last entry to the first entry and replacing every entry that matches the logical address with the predetermined value (e.g., 0xFFFFFFFFFF). Once every entry of the current page table matching the logical address is replaced with the predetermined value (e.g., 0xFFFFFFFFFF), the processing logic proceeds to operation 510.

FIG. 6 is a flow diagram of an example method 600 to performing memory access operation with a logical-to-physical mapping table with reduced size, in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the table management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 610, the processing logic maintains, on a volatile memory device, a logical-to-physical (L2P) data structure (e.g., mapping table) comprising a plurality of mapping table entries. Each mapping table entry comprises a block number and a page table index corresponding to a non-volatile memory device. At operation 620, the processing logic maintains, on the volatile memory device, a plurality of physical-to-logical (P2L) data structures (e.g., page tables) each comprising a page table entries, wherein each of the plurality of page tables corresponds to a portion of the mapping table.

In some embodiments, responsive to receiving, from a host system, a request to perform a memory access operation on a logical address of the non-volatile memory device, the processing device identifies a physical address associated with the logical address to perform the memory access operation. To identify the physical address associated with the logical address to perform the memory access operation, the processing logic identifies a page table, of the plurality of page tables, comprising the physical address associated with the logical address based on the block number and page table index stored in a mapping table entry associated with the logical address. As described previously, the mapping table includes a plurality of page table. Each page table of the mapping table covers several pages of the block across every LUN with the same page index. Additionally, each page table covers each block stripe across every LUN with the same block number. Each entry of the page table records LTU information for each physical address (e.g., LUN, plane, page, TU) that the page table covers.

In some embodiments, the processing logic searches the identified page table of the plurality of page tables to obtain the physical address associated with the logical address. To search the identified page table for the logical address to obtain the physical address associated with the logical address, the processing logic traverses each entry of the identified page table in reverse order starting with a last entry of the identified page table to a first entry of the identified page table until an entry of the identified page table matches the logical address. In some embodiments, the processing logic translates the entry of the identified page table matching the logical address to the physical address (e.g., composes the physical address). As described previously, the physical address is composed based on the location of the matching entry in the page table (e.g., the LUN, plane, page, and TU).

Depending on the embodiment, to search the identified page table of the plurality of page tables to obtain the physical address associated with the logical address, the processing logic partitions, similar to search method 330 (FIG. 3), the identified page table into a plurality of consecutive portions that are indicative of their ordering in the identified page table and traverses, in parallel, each entry of the plurality of consecutive portions of the identified page table in reverse order starting with a last entry to a first entry until an entry of the identified page table in a respective portion of the identified page table matches the logical address or the first entry in the respective portion of the plurality of consecutive portions of the identified page table is reached without matching with the logical address. In some embodiments, the processing logic translates the entry of the identified page table associated with the latest portion of the plurality of consecutive portions of the identified page table matching the logical address to a physical address (e.g., composes the physical address). As described previously, the physical address is composed based on the location of the matching entry in the page table (e.g., the LUN, plane, page, and TU).

Depending on the embodiment, the processing logic receives a request to perform garbage collection operation. During the garbage collection operation, for each entry of a respective page table of the plurality of page tables starting from a first entry of the respective page table to a last entry of the respective page table, the processing logic determines whether a page table associated with a respective entry of the page table matches the respective page table. Responsive to determining that the page table associated with a respective entry of the page table matches the respective page table, the processing logic obtains a first physical address associated with the respective entry of the respective page table and searches, based on the logical address of respective entry of the respective page table, the page table for a second physical address. The processing logic determines whether the first physical address matches the second physical address. Responsive to determining that the first physical address matches the second physical address, the processing logic performs a folding operation with the physical address.

Depending on the embodiment, the processing logic receives a request to perform a garbage collection operation. During the garbage collection operation, for each entry of a respective page table starting from a last entry of the respective page table to a first entry of the respective page table, the processing logic determines whether a value of a respective entry of the respective P2L data structure matches a predetermined value. As described previously, the predetermined value is 0xFFFFFFFFFF indicating that the logical address is invalid. Responsive to determining that the value of the respective entry of the respective page table does not match the predetermined value, the processing logic determines whether a page table entry associated with a respective entry of the page table matches the respective page table. Responsive to determining that the mapping table entry matches the respective page table, the processing logic performs a folding operation with the physical address. After performing the folding operation with the physical address, for each entry of the respective page table starting with a last entry to a first entry, the processing logic replaces, based on the entry matching the logical address associated with the respective entry, overwrite the entry with the predetermined value (e.g., 0xFFFFFFFFFF) indicating that the entry is invalid.

FIG. 7 is a flow diagram of an example method 700 to performing memory access operation with a logical-to-physical mapping table with reduced size, in accordance with some embodiments of the present disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the table management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 710, responsive to receiving, from a host system, a request to perform a memory access operation on a logical address of a non-volatile memory device, the processing logic identifies a physical-to-logical (P2L) data structure (e.g., page table), of a plurality of page tables. Each L2P table entry includes a block number and a page table index corresponding to a non-volatile memory device. Each of the plurality of P2L data structures corresponds to a portion of the L2P data structure.

At operation 720, the processing logic searches the identified page table of the plurality of page tables to obtain the physical address associated with the logical address. As described previously, referring to the search method 300 (FIG. 3A) or the search method 330 (FIG. 3B), to search the identified P2L data structure of the plurality of P2L data structures to obtain the physical address associated with the logical address. For example, the processing logic traverses each entry of the identified P2L data structure in reverse order starting with a last entry of the identified P2L data structure to a first entry of the identified P2L data structure until an entry of the identified P2L data structure matches the logical address.

At operation 730, the processing logic translates the entry of the page table matching the logical address to the physical address.

Depending on the embodiment, the processing logic receives a request to perform a garbage collection operation. During the garbage collection operation, for each entry of a respective page table starting from a last entry of the respective page table to a first entry of the respective page table, the processing logic determines whether a value of a respective entry of the respective P2L data structure matches a predetermined value. As described previously, the predetermined value is 0xFFFFFFFFFF indicating that the logical address is invalid. Responsive to determining that the value of the respective entry of the respective page table does not match the predetermined value, the processing logic determines whether a page table entry associated with a respective entry of the page table matches the respective page table. Responsive to determining that the mapping table entry matches the respective page table, the processing logic performs a folding operation with the physical address. After performing the folding operation with the physical address, for each entry of the respective page table starting with a last entry to a first entry, the processing logic replaces, based on the entry matching the logical address associated with the respective entry, overwrite the entry with the predetermined value (e.g., 0xFFFFFFFFFF) indicating that the entry is invalid.

Figure 8:
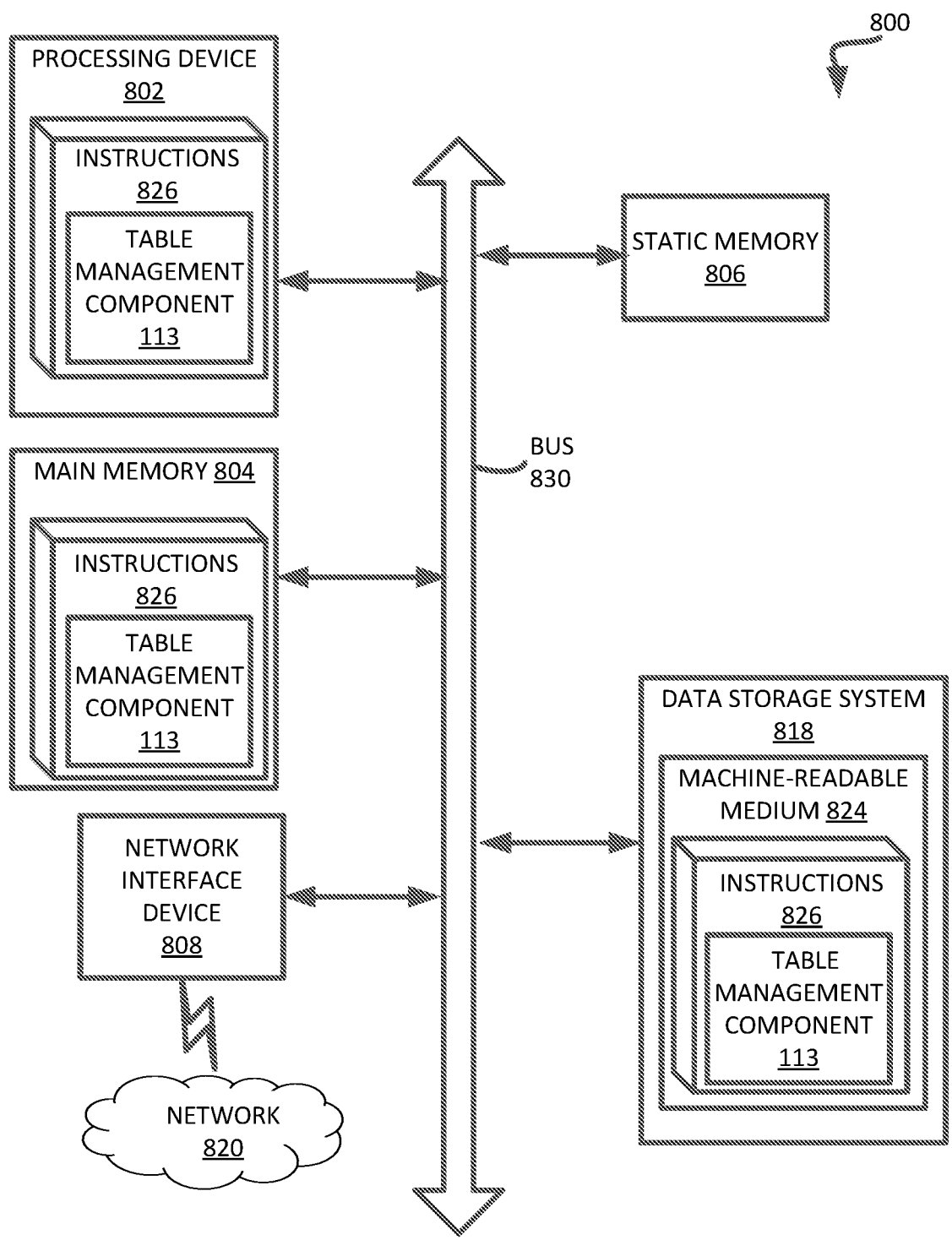
FIG. 8 is a block diagram of an example computer system in which embodiments of the present disclosure may operate.

FIG. 8 illustrates an example machine of a computer system 800 within which a set of instructions, for causing the machine to perform any one or more of the methodologies discussed herein, can be executed. In some embodiments, the computer system 800 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the table management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or RDRAM, etc.), a static memory 806 (e.g., flash memory, static random access memory (SRAM), etc.), and a data storage system 818, which communicate with each other via a bus 830.

Processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein. The computer system 800 can further include a network interface device 808 to communicate over the network 820.

The data storage system 818 can include a machine-readable storage medium 824 (also known as a computer-readable medium) on which is stored one or more sets of instructions 826 or software embodying any one or more of the methodologies or functions described herein. The instructions 826 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage system 818, and/or main memory 804 can correspond to the memory sub-system 110 of FIG. 1.

In one embodiment, the instructions 826 include instructions to implement functionality corresponding to a table management component (e.g., the table management component 113 of FIG. 1). While the machine-readable storage medium 824 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a volatile memory device;
a non-volatile memory device; and
a processing device, operatively coupled with the volatile memory device and the non-volatile memory device, to perform operations comprising:
maintaining, on the volatile memory device, a logical-to-physical (L2P) data structure comprising a plurality of L2P table entries, wherein each L2P table entry is indexed by a respective logical address and comprises a block number and a page table index associated with a physical-to-logical (P2L) data structure of a plurality of P2L data structures;
maintaining, on the volatile memory device, the plurality of P2L data structures each comprising a plurality of P2L table entries, wherein each P2L table entry of the plurality of P2L table entries comprises logical address information for a respective physical address of a plurality of physical addresses associated with the P2L data structure;
responsive to receiving a request to perform a memory access operation on a logical address of the non-volatile memory device, identifying the P2L data structure of the plurality of P2L data structures based on an entry of the L2P data structure associated with the logical address;
searching the identified P2L data structure of the plurality of P2L data structures to obtain a physical address associated with the logical address; and
translating an entry of the identified P2L data structure matching the logical address to the physical address.

2. The system of claim 1, wherein searching the identified P2L data structure of the plurality of P2L data structures for the logical address to obtain the physical address associated with the logical address includes traversing each entry of the identified P2L data structure in reverse order starting with a last entry of the identified P2L data structure to a first entry of the identified P2L data structure until an entry of the identified P2L data structure matches the logical address.

3. The system of claim 1, wherein searching the identified P2L data structure of the plurality of P2L data structures to obtain the physical address associated with the logical address includes partitioning the identified P2L data structure into a plurality of consecutive portions that are indicative of their ordering in the identified P2L data structure and traversing, in parallel, each entry of the plurality of consecutive portions of the identified P2L data structure in reverse order starting with a last entry to a first entry until one of: an entry of the identified P2L data structure in a respective portion of the identified P2L data structure matches the logical address or the first entry in the respective portion of the plurality of consecutive portions of the identified P2L data structure is reached without matching the logical address.

4. The system of claim 3, wherein the processing device is to perform operations further comprising:
translating the entry of the identified P2L data structure associated with a latest portion of the plurality of consecutive portions of the identified P2L data structure matching the logical address to the physical address.

5. The system of claim 1, wherein the processing device is to perform operations further comprising:
receiving a request to perform garbage collection operation;
for each entry of a respective P2L data structure of the plurality of P2L data structures starting from a first entry of the respective P2L data structure to a last entry of the respective P2L data structure, determining whether a P2L data structure associated with a respective entry of the respective P2L data structure matches the respective P2L data structure;
obtaining a first physical address associated with the respective entry of the respective P2L data structure;
searching, based on the logical address of respective entry of the respective P2L data structure, the respective P2L data structure for a second physical address;

determining whether the first physical address matches the second physical address; and responsive to determining that the first physical address matches the second physical address, folding the logical address associated with the respective entry of the respective P2L data structure.

6. The system of claim 1, wherein the processing device is to perform operations further comprising:

receiving a request to perform a garbage collection operation;

for each entry of a respective P2L data structure starting from a last entry of the respective P2L data structure to a first entry of the respective P2L data structure, determining whether a value of a respective entry of the respective P2L data structure matches a predetermined value;

responsive to determining that the value of the respective entry of the respective P2L data structure does not match the predetermined value, determining whether a L2P table entry associated with a respective entry of the respective P2L data structure matches the respective P2L data structure;

responsive to determining that the L2P table entry matches the respective P2L data structure, folding the logical address associated with the respective entry of the respective P2L data structure; and for each entry of the respective P2L data structure starting with a last entry to a first entry, replacing, based on the entry matching the logical address associated with the respective entry, overwriting the entry with the predetermined value indicating that the entry is invalid.

7. A method comprising:

responsive to receiving, from a host system, a request to perform a memory access operation on a logical address of a non-volatile memory device, identifying a physical-to-logical (P2L) data structure of a plurality of physical-to-logical (P2L) data structures based on an entry of a logical-to-physical (L2P) data structure associated with the logical address, the entry of the L2P comprising a block number and a page table index associated with the P2L data structure of the plurality of P2L data structures;

searching the identified P2L data structure of the plurality of P2L data structures to obtain a physical address associated with the logical address; and translating an entry of the identified P2L data structure matching the logical address to the physical address.

8. The method of claim 7, wherein searching the identified P2L data structure of the plurality of P2L data structures to obtain the physical address associated with the logical address includes traversing each entry of the identified P2L data structure in reverse order starting with a last entry of the identified P2L data structure to a first entry of the identified P2L data structure until an entry of the identified P2L data structure matches the logical address.

9. The method of claim 7, wherein each L2P table entry comprises a block number and a page table index corresponding to a non-volatile memory device.

10. The method of claim 7, wherein each of the plurality of P2L data structures corresponds to a portion of the L2P data structure.

11. The method of claim 7, further comprising:

receiving a request to perform a garbage collection operation;

for each entry of a respective P2L data structure starting from a last entry of the respective P2L data structure to a first entry of the respective P2L data structure, determining whether a value of a respective entry of the respective P2L data structure matches a predetermined value;

responsive to determining that the value of the respective entry of the respective P2L data structure does not match the predetermined value, determining whether a L2P table entry associated with a respective entry of the respective P2L data structure matches the respective P2L data structure;

responsive to determining that the L2P table entry matches the respective P2L data structure, folding the a logical address associated with the respective entry of the respective P2L data structure; and for each entry of the respective P2L data structure starting with a last entry to a first entry, replacing, based on the entry matching the logical address associated with the respective entry, overwriting the entry with the predetermined value indicating that the entry is invalid.

12. A non-transitory computer-readable medium comprising instructions that, responsive to execution by a processing device, cause the processing device to perform operations comprising:

responsive to receiving, from a host system, a request to perform a memory access operation on a logical address of a non-volatile memory device, identifying a physical-to-logical (P2L) data structure of a plurality of physical-to-logical (P2L) data structures based on an entry of a logical-to-physical (L2P) data structure associated with the logical address, the entry of the L2P comprising a block number and a page table index associated with the P2L data structure of the plurality of P2L data structures;

searching the identified P2L data structure of the plurality of P2L data structures to obtain a physical address associated with the logical address; and translating an entry of the identified P2L data structure matching the logical address to the physical address.

13. The non-transitory computer-readable medium of claim 12, wherein searching the identified P2L data structure of the plurality of P2L data structures to obtain the physical address associated with the logical address includes traversing each entry of the identified P2L data structure in reverse order starting with a last entry of the identified P2L data structure to a first entry of the identified P2L data structure until an entry of the identified P2L data structure matches the logical address.

14. The non-transitory computer-readable medium of claim 12, wherein each L2P table entry comprises a block number and a page table index corresponding to a non-volatile memory device.

15. The non-transitory computer-readable medium of claim 12, wherein each of the plurality of P2L data structures corresponds to a portion of the L2P data structure.

16. The non-transitory computer-readable medium of claim 12, wherein causing the processing device to further perform operations comprising:

receiving a request to perform a garbage collection operation;

for each entry of a respective P2L data structure starting from a last entry of the respective P2L data structure to a first entry of the respective P2L data structure, determining whether a value of a respective entry of the respective P2L data structure matches a predetermined value;

responsive to determining that the value of the respective entry of the respective P2L data structure does not match the predetermined value, determining whether a L2P table entry associated with a respective entry of the respective P2L data structure matches the respective P2L data structure;

responsive to determining that the L2P table entry matches the respective P2L data structure, folding the a logical address associated with the respective entry of the respective P2L data structure; and for each entry of the respective P2L data structure starting with a last entry to a first entry, replacing, based on the entry matching the logical address associated with the respective entry, overwriting the entry with the predetermined value indicating that the entry is invalid.

* * * * *